United States Patent [19]

Ferraro et al.

[11] Patent Number: 5,044,077
[45] Date of Patent: Sep. 3, 1991

[54] RAZOR MECHANISM

[75] Inventors: Frank A. Ferraro, Trumbull; Evan N. Chen, Fairfield, both of Conn.

[73] Assignee: Warner-Lambert Company, Morris Plains, N.J.

[21] Appl. No.: 507,269

[22] Filed: Apr. 10, 1990

[51] Int. Cl.5 .................. B26B 21/08; B26B 21/14; B26B 21/30; B26B 21/00
[52] U.S. Cl. .......................... 30/85; 30/47; 30/51; 30/89
[58] Field of Search ................ 30/43.3, 47, 50, 51, 30/57, 72, 85, 87, 89, 346, 58

[56] References Cited

U.S. PATENT DOCUMENTS

| 4,266,340 | 5/1981 | Bowman | 30/47 |
|---|---|---|---|
| 4,337,575 | 7/1982 | Trotta | 30/47 |
| 4,409,735 | 10/1983 | Cartwright | 30/47 |
| 4,428,116 | 1/1984 | Chen et al. | 30/87 |
| 4,658,505 | 4/1987 | Williams | 30/47 |
| 4,780,959 | 11/1988 | Sinka | 30/47 |
| 4,797,998 | 1/1989 | Motta | 30/85 |
| 4,922,609 | 5/1990 | Grange | 30/89 |

Primary Examiner—Douglas D. Watts
Assistant Examiner—Paul M. Heyrana, Sr.
Attorney, Agent, or Firm—Daniel A. Scola, Jr.; Richard S. Bullitt

[57] ABSTRACT

A razor mechanism particularly suited for use with a flexible cartridge having at least one attachment member freely moveable in a direction substantially toward the longitudinal axis of the razor mechanism in response to the flexing of the razor cartridge during shaving.

20 Claims, 5 Drawing Sheets

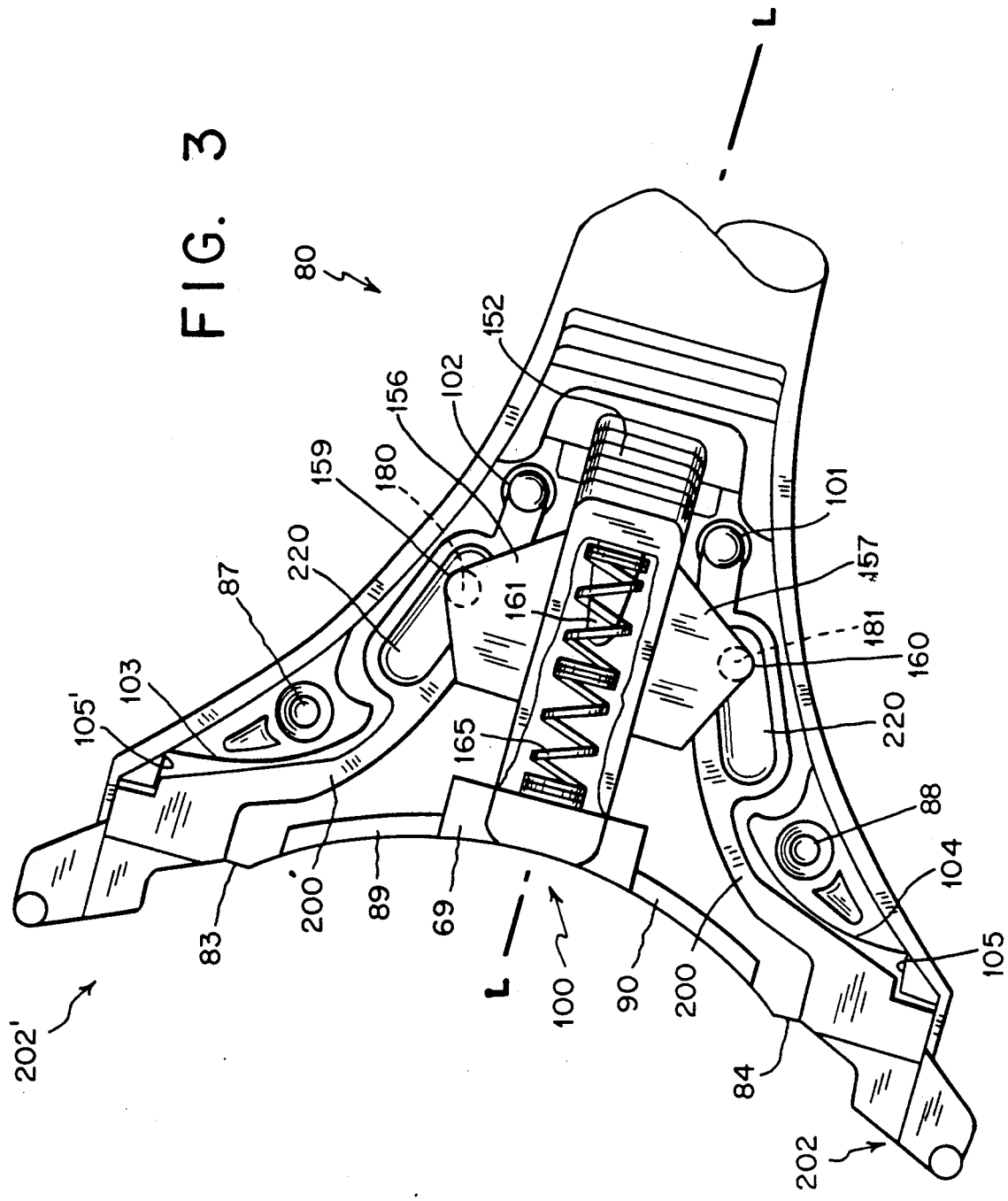

RAZOR MECHANISM

BACKGROUND OF THE INVENTION

The present invention is directed to a razor mechanism and, more particularly, to a razor mechanism especially adapted to support a flexible cartridge.

Many types of razor mechanisms are known in the art. Razor mechanisms have been designed to securably support a cartridge containing at least one razor blade at the ends and/or at least one midpoint of the cartridge.

Among the various types of razor mechanisms known in the art are the channel-type razors which typically have two fixed opposing bars adapted to slidably receive a cartridge having a corresponding fixed track. Such channel-type razors provide support to a cartridge along the entire longitudinal length of the cartridge. An example of a "channel-type" cartridge having a changeable blade geometry having a track for such support is shown in U.S. Pat. No. 3,890,704 to Ferraro.

Another type of razor known in the art includes spring actuated engaging members which, upon the application of force to an actuator button, move inwardly or outwardly. After the cartridge has been properly positioned on the razor handle, the actuator button is released allowing the engaging members to return to their non-biased position and thereby engage the cartridge. Such razors have been designed to either maintain the razor cartridge fixed with respect to the razor handle or, are of the "pivoting" type, which allow the cartridge to pivot on the razor during shaving. An improved razor which allows the cartridge to pivot or to be locked in a non-pivoting manner is disclosed in U.S. Pat. No. 4,797,998 which issued to Vincent Motta on Jan. 17, 1989 entitled Lockable Pivotable Razor.

The attaching mechanisms of the razors known in the prior art have generally been designed to remain in fixed lateral positions while the razor is in use. For example, U.S. Pat. No. 4,069,580 to Cartwright et al. which reissued as U.S. Pat. No. Re. 30,913 discloses a flexible blade cartridge wherein the cartridge is supported on fixed pins of the shaving handle head. Another support for a flexible blade cartridge is disclosed in U.S. Pat. No. 4,443,939 to Motta et al.

In order to provide a closer shave, a new type of flexible razor head has recently been developed. One embodiment of this new flexible razor head, disclosed in co-pending U.S. patent application Ser. No. 115,781, filed on Oct. 30, 1987 which is hereby incorporated by reference, comprises a flexible cartridge which is designed to flex along its longitudinal axis during shaving. From the description in that patent application, it will be appreciated by those skilled in the art that when the razor cartridge flexes along its longitudinal axis, the linear distance between the ends of the cartridge decreases. Since the attachment mechanisms of razors known in the art have been conventionally designed to remain in fixed positions except when the cartridge is being attached or detached from the razor, such conventional handles would either not permit the desired flexing of the flexible-type cartridges or, if such flexing was permitted, would create the risk that the cartridge becomes detached from the razor mechanism.

Additionally, razor mechanisms known in the art for flexible cartridges require the flexing of the razor cartridges when the cartridge is being attached to the razor mechanism. It would be very desirable to eliminate the danger inherent in the handling of a cartridge containing sharp blades especially when such handling requires the manual flexing of a flexible cartridge which could slip and injure the person assembling the cartridge on the razor mechanism.

In light of the relatively new flexible-type cartridge design, it is also desirable to provide a razor mechanism wherein the attaching mechanism will securably connect a flexible cartridge to the razor handle while permitting the cartridge to flex during shaving. It would be especially advantageous to provide a razor mechanism which gives additional support to a flexible cartridge when the cartridge is engaged.

SUMMARY OF THE INVENTION

The present invention comprises a razor mechanism having at least one attachment end which is pivotable in a direction toward the center axis of the razor in response to the flexing of a flexible cartridge during shaving. The razor mechanism preferably comprises a housing, an actuator and at least one rigid attachment member. The actuator is slidably connected to the housing and has at least one prong member which engages the attachment member. The attachment member is partially disposed within the housing and has an attachment end for engagement with a flexible cartridge in a manner which provides moveable support to the cartridge when the cartridge is flexed during shaving.

BRIEF DESCRIPTION OF THE DRAWINGS

FIG. 3 is a cross-sectional top view of the bottom assembly of the razor mechanism of one embodiment of the present invention taken along lines 3—3 of FIG. 1 with sections removed.

DETAILED DESCRIPTION

Figure 1:
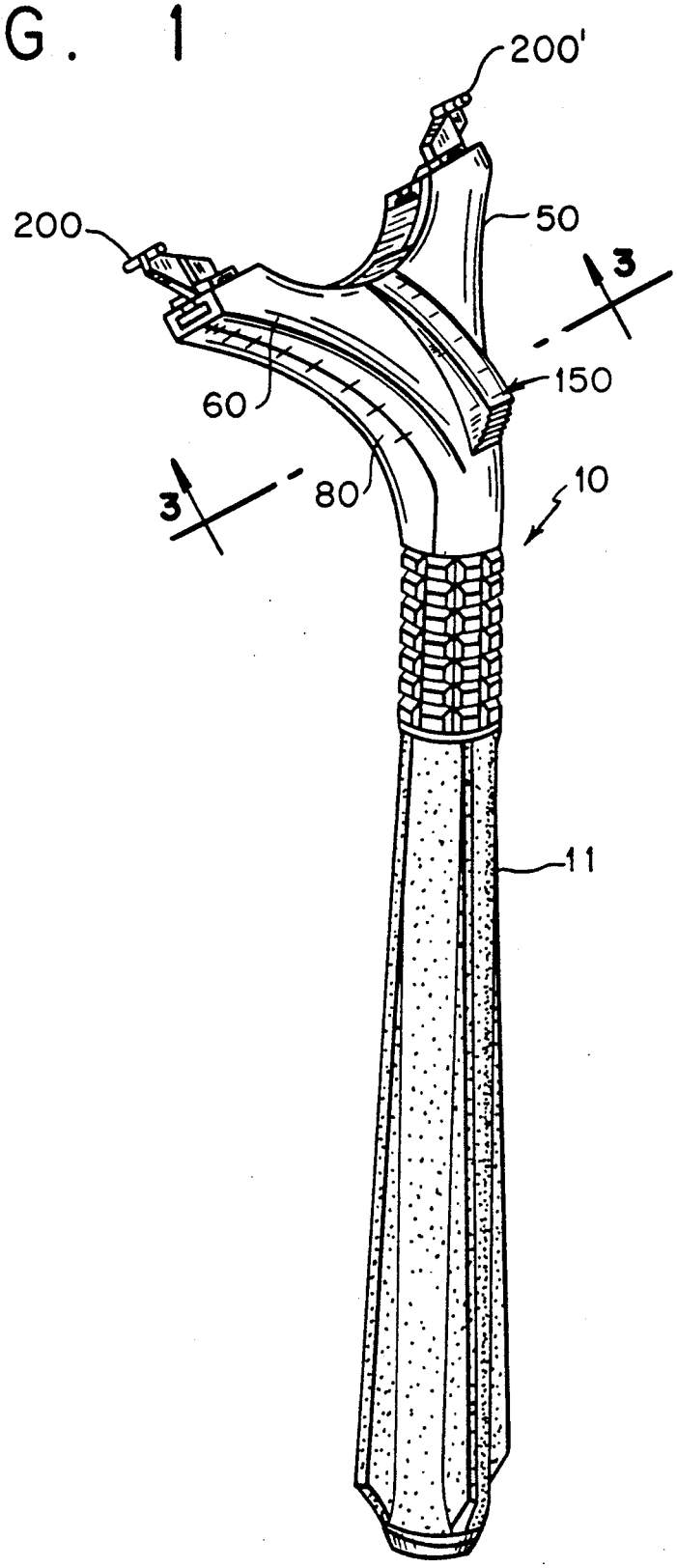
FIG. 1 is a perspective view of the razor mechanism of one embodiment of the present invention.

As shown in FIG. 1, razor mechanism 10 of one embodiment of the present invention comprises a housing 50, two attachment members 200, 200' and an actuator 150. Housing 50 comprises a top cover 60 and a bottom frame 80. The razor mechanism 10, is adapted to be attached to a handle extension 11.

Figure 2:
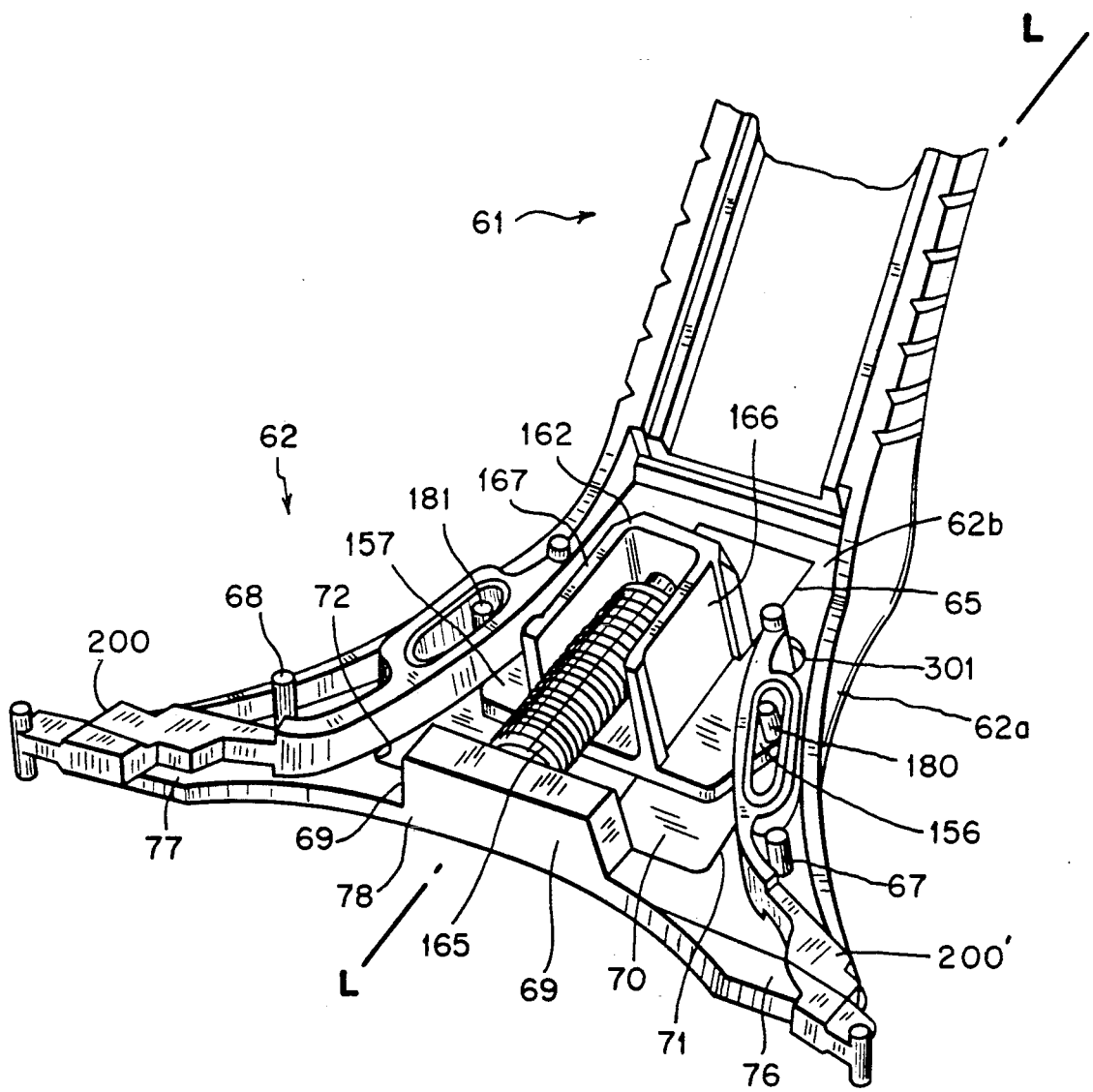
FIG. 2 is a bottom, perspective view of one embodiment of the top cover assembly of the present invention.

FIG. 2 illustrates the cooperative arrangement of attachment members 200 and 200', and actuator 150 which is biased in the proximal direction by spring 165. Top cover 60 comprises a gripping portion 61 and a control portion 62. Control portion 62 has a central longitudinal axis L. Gripping portion 61 may be designed to have any desirable cross section, for example cylindrical, and is preferably knurled to facilitate gripping by the person shaving.

Control portion 62 of top cover 60 has an exterior side 62a and an interior side 62b. Control portion 62 also comprises a window 65 passing through control portion 62 from exterior side 62a to interior side 62b. The longitudinal edges of window 65 are substantially parallel to longitudinal axis L. Window 65 is adapted to slidably receive the actuator 150 and is preferably located in the central region of control portion 62.

The interior side 62b of control portion comprises an abutment member 69 which extends downwardly from interior side 62b as shown in FIG. 2 and is preferably disposed adjacent the distal end of window 65. As used herein, the term "distal end" refers to the end of an element closest to the end of the razor mechanism which receives a cartridge and the "proximal end" refers to the opposite end, i.e. closest to the handle extension 11. Attachment pins 67 and 68 are provided on interior side 62b for engagement in corresponding receptacles 87 and 88 on the interior side of bottom frame 80 shown in FIG. 3. Receptacles 87 and 88 are preferably chamfered to aid in the insertion of attachment pins 67 and 68. While the use of pins 67, 68 and corresponding receptacles 87 and 88 is preferred, it will be appreciated by those skilled in the art that top cover 60 and bottom frame 80 may be attached by any suitable method known in the art.

As shown in FIG. 2, control portion 62 has a shape which generally flares outwardly from gripping portion 61 and has guide ends 76 and 77 at the distal end of control portion 62 for reasons discussed below. The central distal portion 78 of top cover 60 does not extend as far distally as guide ends 76 and 77. In a manner discussed below, guide ends 76, 77 guide attachment members 200', 200 in directions generally perpendicular to axis L.

While gripping portion 61 and control portion 62 may be disposed generally in the same plane, in a preferred embodiment of the present invention as shown in FIG. 2, gripping portion 61 is disposed at an angle to control portion 62. While the actual angle may vary, it will be appreciated by those skilled in the art that the angle is preferably in the range of about 145 to 160 degrees, and is most preferably about 150 degrees.

Also located adjacent and on both sides of window 65 on the interior side 62b of top cover 60 are grooves 70. The grooves 70 have outer edges 71 and 72 which extend generally parallel to the longitudinal edges of window 65. As explained in further detail below, the grooves 70 guide the actuator 150 as the actuator 150 is moved within window 65.

Interior portion 62b of top cover 60 also has recesses 301 and 302 (not shown) disposed adjacent window 65 and proximally of grooves 70. Recesses 301 and 302, along with corresponding recesses 101 and 102 of bottom frame 80, pivotally secure attachment members 200 and 200' within housing 50.

With reference to FIG. 3, an actuator 150 is slidably disposed in window 65 of top cover 60. Actuator 150 comprises an upper gripping portion 152 having a width slightly less than the width of window 65 and a length slightly greater than the length of window 65. Upper gripping surface 152 may be provided with ridges to facilitate the gripping of actuator 150 by a person desiring to position a cartridge on razor mechanism 10.

Actuator 150 also has shoulders 156 and 157 which are disposed below and to either side of upper gripping portion 152. The shoulders 156 and 157 extend outwardly such that the distance between the ends 159 and 160 of shoulders 156 and 157, respectively, is greater than the width of window 65. As illustrated in FIG. 2, shoulders 156 and 157 are designed to slidingly fit within grooves 70 of control portion 62.

As shown in FIG. 2, actuator 150 also comprises prong members 180 and 181 which extend downwardly from shoulders 156 and 157. In the illustrated embodiment, prong members 180 and 181 are positioned at the ends 159 and 160 of shoulders 156 and 157, respectively, however, it will be appreciated that alternate positioning is possible within the scope of the present invention.

Actuator 150 also has a pin member 161 (best shown in FIG. 3), mounted on a support member 162 (best shown in FIG. 2) disposed below upper gripping surface 152 and toward the proximal end of actuator 150. Pin member 161 is designed to engage the proximal end of a spring 165. The distal end of spring 165 rests against abutment member 69 and thereby biases actuator 150 toward the proximal end of control portion 62. As illustrated in FIG. 2, three sides of pin member 161 may be substantially surrounded by support member 162 and pin walls 166 and 167 in order to prevent other moving elements of the razor mechanism 10 from interfering with the action of spring 165.

From the above description, it will be appreciated that actuator 150 and spring 165 are designed for easy assembly with top cover 60. During assembly, the spring 165 is placed over the pin member 161 and gripping portion 152 of actuator 150 is inserted, distal end first, upwardly through window 65 of control portion 62. It will be appreciated that shoulders 156 and 157 prevent actuator 150 from passing entirely through window 65. When the distal end of actuator 150 has passed through window 65, the actuator is slid distally compressing spring 165, and then actuator 150 is rotated so that the proximal end of actuator 150 passes through window 65. When the actuator 150 is then released, spring 165 which is then in contact with abutment member 69, urges actuator 150 proximally in window 65. In order to facilitate the placement of actuator 150 in window 65 of control portion 62, the distance between the distal end of shoulders 156 and 157 and the proximal end of upper gripping surface 152 is less than the longitudinal length of window 65. As stated above, the longitudinal length of gripping member 152 is greater than the longitudinal length of window 65, therefore, unless actuator 150 is rotated relative to control portion 62, actuator 150 will not fall downwardly through window 65 after it has been installed. After razor mechanism 10 has been assembled, the proper positioning of actuator 150 is maintained by the proximal ends of grooves 70 which are positioned to contact the proximal ends of shoulders 156 and 157 at a location which stops the movement of actuator 150 in the proximal direction before the distal end of upper gripping surface 152 reaches the distal end of window 65.

Thus it will be appreciated by those skilled in the art that a spring 165 may be placed upon pin member 161 of actuator 150 and actuator 150 can then be easily positioned within control portion 62 of top cover 60. Spring 165 serves the dual purposes of biasing actuator 150 toward the proximal end of control portion 62 and maintaining actuator 152 within the control portion 62 during normal operation of the razor mechanism 10.

As stated above, the interior side of bottom frame 80 also has recesses 101 and 102, which are preferably circular, in order to pivotally receive protrusions of attachment member 200. The interior side of bottom frame 80 also has receptacles 87 and 88 which receive attachment pins 67 and 68 of top cover 60. The receptacles 87 and 88 are preferably chamfered in order to facilitate the aligning of pins 67 and 68 within receptacles 87 and 88. Attachment pins 67 and 68 of top cover 60 may be secured within receptacles 87, 88 of bottom frame 80 by any suitable method known in the art, such as by ultrasonic welding.

As shown in FIG. 3, bottom frame 80 is shaped to correspond to top cover 60 such that the distal end generally flares outwardly from the proximal end. The distal end of bottom frame 80 has guide ends 83 and 84. The central, distal portion 100 of bottom frame 80 does not extend as far distally as guide ends 83 and 84. Disposed between the central, distal portion 100 and guide ends 83, 84 are lower end plates 89 and 90 which extend upwardly from the interior side of bottom frame 80. Lower end plates 89 and 90, in cooperation with abutment member 69 of top cover 60, substantially seal the distal end of housing 50 to prevent soap, hair and other debris from entering the interior of housing 50 and interfering with the movement of pieces located therein. With the exception of the distal end portions of housing 50, top cover 60 and bottom frame 80 are preferably in contact to prevent debris from entering the interior of housing 50 from other sides as well.

Interior guide surfaces 103 and 104 are advantageously disposed adjacent to receptacles 87 and 88, near the exterior edges of bottom frame 80. The interior guide surfaces 103 and 104, along with lower end plates 89 and 90 generally define a guide channel for attachment member 200.

Disposed toward the distal ends of interior guide surfaces 103 and 104, and spaced proximally from lateral guide ridges 85 and 86, are stops 105 and 105' which protrude upwardly. As illustrated in FIG. 3, stops 105 and 105' limit the outward movement of attachment members 200 and 200'.

Bottom frame 80 may be provided with a centrally located generally rectangular recess having a width slightly greater than the width of support member 162. The rectangular recess would slidingly receive the lower end of actuator 150 defined by support member 162 and pin walls 166 and 167 in order to provide further guidance and support to the sliding movement of actuator 15 within housing 50.

Figure 5:
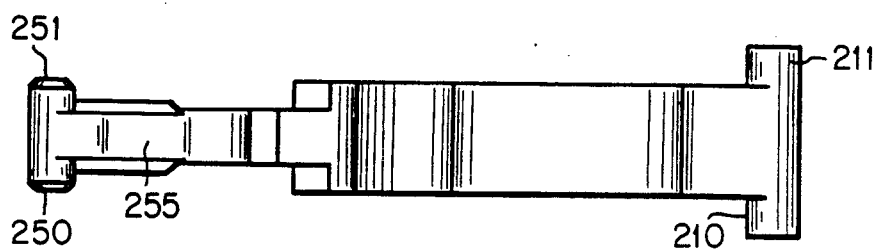
FIG. 5 is a side view of the attachment member shown in FIG. 4.
Figure 4:
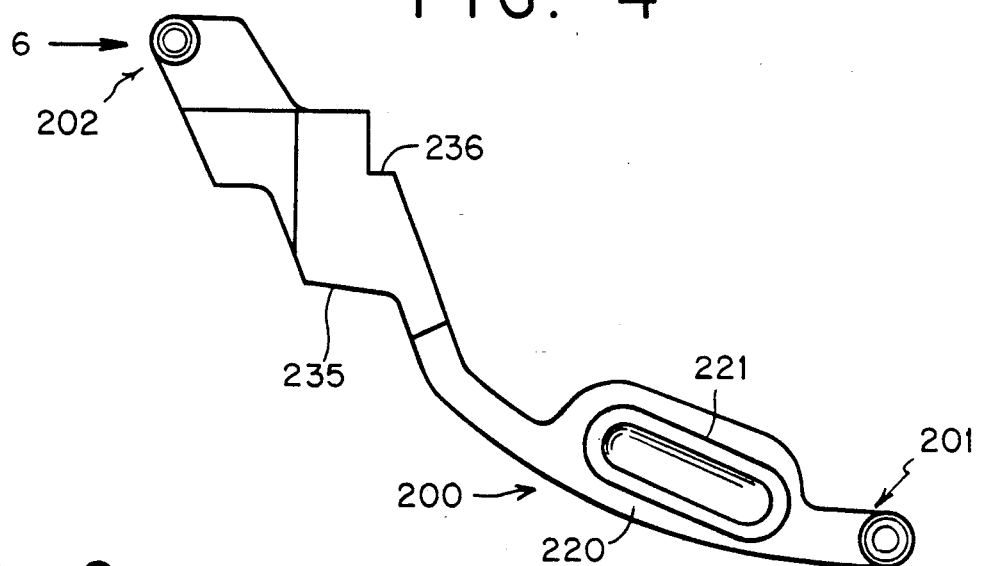
FIG. 4 is a top view of an attachment member of one embodiment of the present invention.
Figure 6:
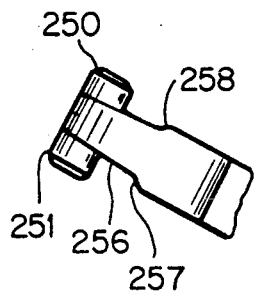
FIG. 6 is a side view of the attachment end of the attachment member shown in FIG. 4 taken from the direction indicated by ARROW 6 in FIG. 4.

With reference to FIGS. 4-6, attachment member 200 comprises a proximal end 201 and a distal end 202. Proximal end 201 has protrusions 210 and 211 which are adapted to pivotly connect attachment member 200 to the recesses 301 and 101 in top cover 60 and bottom frame 80, respectively. It will be appreciated by those skilled in the art that other mechanical arrangements may be utilized in pivotally attaching the proximal end 201 of attachment member 200 within housing 50.

Attachment member 200 also comprises an actuator receptor 220 which receives a prong member 181 of actuator 150. When attachment member 200 is disposed within housing 50 and the proximal end 201 of attachment member 200 is pivotally attached in recesses 101 and 301, the actuator receptor 220 is disposed at an acute angle to the longitudinal axis L of razor mechanism 10. The acute angle, which is defined by a central line passing down the center of actuator receptor 220 and the longitudinal axis L of housing 50, is preferably between about 20 and 45 degrees when the attachment member 200 is in a relaxed position, i.e. when attachment member 200 is not subject to outside forces such as those exerted by the actuator 150 or by a flexed cartridge at distal end 202. When attachment member 200 is in this "relaxed" position, prong 181 of actuator 150 is disposed at the proximal end of actuator receptor 220. While actuator receptor 220 preferably has chamfered ridges 221 and preferably passes entirely through attachment member 200, it will be appreciated by those skilled in the art that similarly positioned grooves which do not pass entirely through attachment member 200 may be utilized.

Disposed between the distal end 202 and actuator receptor 220 are inner stop surface 235 and outer stop surface 236. Outer stop surface 236 is aligned to contact stop 105 and thereby limits the outward movement of attachment member 200 when attachment member 200 is in a "relaxed" position. Inner stop surface 235 is aligned to contact lower end plate 90 which thereby limits the inward movement of attachment member 200 when an inwardly directed force is exerted on attachment member 200.

With reference to FIG. 6, distal end 202 of attachment member 200 has protrusion members 250 and 251 mounted on neck 255. Neck 255 may be advantageously tapered having a narrower end 256 immediately adjacent protrusion members 250 and 251 and gradually get wider toward the proximal end of attachment member 200 until reaching shoulders 257 and 258. The advantages provided by this tapered configuration are discussed below.

The illustrated embodiment of the present invention utilizes two attachment members 200 and 200'. The attachment members 200 and 200' are preferably arranged such that the proximal ends are pivotally connected to the interior of housing 50, actuator receptors receive prong members 180 and 181 also within the interior of housing 50, and the distal ends of the attachment members are disposed outside of housing 50. In this manner, the attachment ends of attachment members are guided in an arcuate direction toward the longitudinal axis L in response to forces applied by a flexing cartridge or by actuator 150.

When actuator 150 is slid toward the distal end of housing 50, prong members 180 and 181 engage the inner edges of the actuator receptors 220. Since prong members 180 and 181 move parallel to the longitudinal axis L of the razor handle mechanism 10, it will be appreciated from the above description and Figures that the distal end 223 of actuator receptor 220 is pulled toward the center of razor mechanism 10. Movement of actuator receptor 220 causes the movement of distal end 202 of attachment member 200 toward the longitudinal axis L of razor mechanism 10. This "inward" movement of the distal ends of attachment members 200, 200' enables the easy attachment and detachment of a flexible razor cartridge having a corresponding connector receptor, as discussed below.

Figure 7:
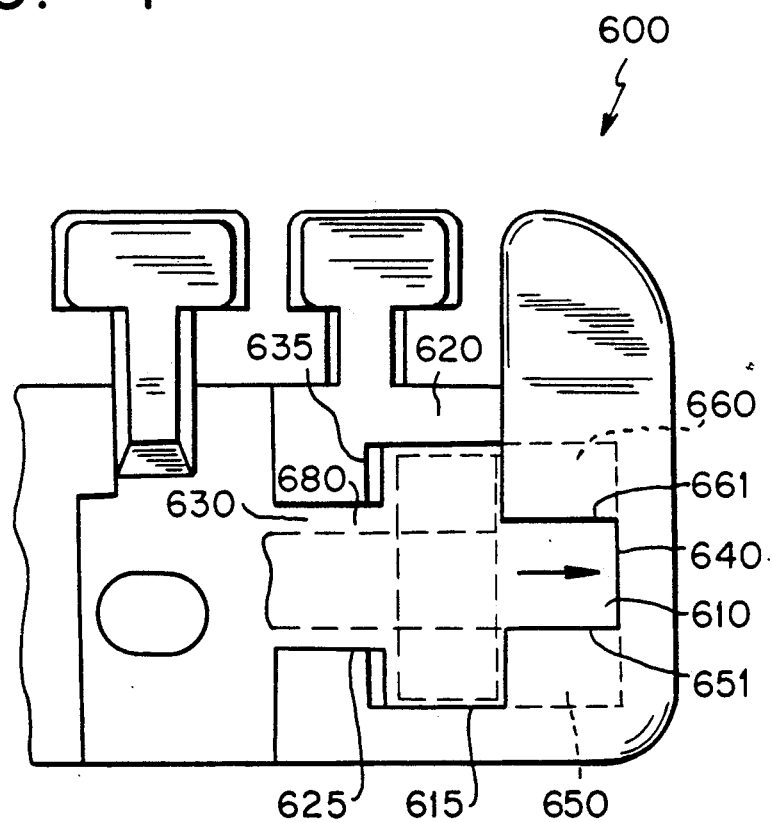
FIG. 7 is a bottom view of a portion of a flexible cartridge which may be used with the razor mechanism of the present invention.

With reference to FIG. 7 wherein a flexible cartridge 600 adapted to be supported by the razor mechanism 10 of the present invention is shown having an attachment slot 610 defined by outer sidewalls 615 and 620, inner wall 635, outer wall 640, and slot cover plates 650 and 660 having inner edges 651 and 661, respectively. Inner wall 635 has an inner wall slot 680 defined by inner side walls 625 and 630. The slot cover plates 650 and 660 cover the outer ends of the slot 610 but, as shown in FIG. 7, leave a portion of the inner end of slot 610 and the entire central region of slot 610 uncovered for the passage of neck 255 of attachment member 200.

In order to attach the flexible cartridge 600 to attachments members 200, 200', the actuator 150 is moved distally causing distal ends 202, 202' to move "inwardly". The protrusions members 250 and 251 are inserted into the inner end of slot 610 and then, upon release of actuator 150, are biased outwardly to the end of slot 610 covered by slot cover plates 650 and 660. The razor mechanism 10 of the illustrated embodiment of the present invention advantageously provides movable support to a flexible cartridge since the attachment members are freely movable in response to inwardly directed forces exerted by a flexed cartridge during shaving.

When flexible cartridge 600 is positioned on attachment members 200, 200' and flexible cartridge 600 is in a relaxed position, only an upper portion of tapered neck 255 will be disposed within slot 610 and inner wall slot 680. However, when the flexible cartridge 600 is flexed during shaving, a greater portion of neck 255 will enter and be disposed within slot 610 and inner wall slot 680. When neck 255 has the preferred tapered shape, it will be appreciated by those skilled in the art that the clearance between neck 255 and inner edges 651 and 661 as well as inner side walls 625 and 630 will decrease, preferably to the point of contact, when cartridge 600 is flexed during shaving. In this manner, the flexing of flexible cartridge 600 serves to form a tighter connection between cartridge 600 and razor handle 10 which is thereby less likely to rock or pivot.

While not necessary to the proper functioning of the present invention, the razor mechanism 10 of the present invention is preferably made such that all elements are symmetrical about the longitudinal axis L of the razor mechanism 10. It will, therefore, be appreciated that, even though the description given above for some elements has been generally provided for only one half of razor mechanism 10 and its elements, the other half, i.e. the portion on the opposite side of the longitudinal axis L, preferably operate in an identical manner. It will be appreciated by those skilled in the art that the use of symmetrical pieces may lessen the expense during the manufacturing of the razor mechanism 10 of the present invention.

As used herein, the term "flexible" includes shaving blade assemblies in which the amount of flexing thereof in response to normal human shaving forces is sufficient to substantially conform the blade assembly to many of the non-planar surfaces shaved, and to exclude the relatively rigid prior art shaving blade assemblies which in response to those same shaving forces do not flex or yield more than an insignificant amount insofar as contour-following characteristics are concerned. The term "freely" is used to indicate that the attachment end of the attachment member is not locked in position and moves in response to the flexing of a flexible cartridge subject to normal shaving forces. The term "freely" is not intended to exclude any type of biasing element, such as spring 165, which may directly or indirectly apply a force to the attachment member.

It will be appreciated by those skilled in the art that a typical razor cartridge is on the order of about 1.6 inch long. The present invention is designed to support flexible razor cartridges which may be deflected up to about 0.20 inches and preferably about 0.120 inches at their midpoints. It will be appreciated that this deflection is measured as the distance between the midpoint of the razor cartridge when the razor cartridge is in a "relaxed", generally straight configuration and when the cartridge is flexed as much as the razor mechanism of the present invention will permit during shaving. The attachment members of the present invention are designed to each move inwardly a maximum distance of about 0.040 inches, and preferably to move inwardly a distance of about 0.015 inches. The attachment members preferably move about 0.015 inches when the midpoint of the flexible cartridge is deflected about 0.050 inches. The attachment members preferably move about 0.015 inches in response to forces of about 60–110 grams, most preferably about 80 grams, on the midpoint of the flexible cartridge.

What is claimed is:

1. A razor mechanism comprising:
   a base member having a central longitudinal axis;
   means for attaching a flexible cartridge to said razor mechanism such that said cartridge is disposed substantially perpendicular to said longitudinal axis, wherein said attaching means is moveably connected to said base member;
   means for moving said attaching means such that upon movement of said moving means said attaching means moves in a direction substantially toward said longitudinal axis; and
   wherein said attaching means is freely moveable in a direction substantially toward said longitudinal axis in response to flexing of said flexible cartridge during shaving.

2. A razor mechanism according to claim 1 wherein said attaching means is pivotally connected to said base member.

3. A razor mechanism according to claim 1 wherein said attaching means comprises more than one attachment member.

4. A razor mechanism according to claim 1 wherein said moving means is a slideable actuator having at least one prong member which slidingly engages said attaching means.

5. A razor mechanism according to claim 1 wherein said razor mechanism has a distal end and a proximal end and wherein said slidable actuator is biased toward said proximal end.

6. A razor mechanism according to claim 1 wherein said attaching means comprises at least one substantially rigid attachment member pivotally disposed on said base member.

7. A razor mechanism according to claim 6 wherein said attaching means comprises two substantially rigid attachment members.

8. A razor mechanism according to claim 1 wherein said attaching means is biased away from said longitudinal axis.

9. A razor mechanism, having a central longitudinal axis, for use with a flexible cartridge comprising:
   means for supporting said flexible cartridge on said razor mechanism,
   said supporting means being moveable in a direction substantially toward said longitudinal axis of said razor mechanism in response to the flexing of said flexible cartridge during shaving.

10. A razor mechanism for use with a flexible cartridge comprising:
    a housing having a substantially enclosed interior portion, a distal end, a proximal end and a central longitudinal axis extending from said distal end to said proximal end;
    an actuator slidably connected to said housing for movement in a direction substantially parallel to said longitudinal axis, said actuator comprising at least one prong member;

an attachment member having a pivoting end and an attachment end, wherein said pivoting end is pivotally connected to said housing within said interior portion, and at least a portion of said attachment member is disposed within said interior portion, said attachment end is moveable in response to the flexing of said flexible cartridge during shaving; and wherein said actuator engages said attachment member such that said attachment end moves substantially toward said longitudinal axis in response to the movement of said actuator.

11. A razor mechanism according to claim 10 wherein said razor mechanism comprises two attachment members disposed on opposite sides of said central longitudinal axis.

12. A razor mechanism according to claim 10 wherein said attachment member is formed of a thermoplastic material.

13. A razor mechanism according to claim 10 wherein said attachment member comprises an actuator receptor which slidingly receives said prong member.

14. A razor mechanism according to claim 13 wherein said actuator receptor is normally disposed at an obtuse angle with said longitudinal axis.

15. A razor mechanism according to claim 10 wherein said actuator is biased toward said proximal end of said housing.

16. A razor mechanism according to claim 15 wherein said actuator is biased by at least one spring.

17. A razor mechanism according to claim 10 wherein said attachment end comprises a neck portion having an outer end and an inner end, and wherein said outer end of said neck portion is narrower than said inner end of said neck portion.

18. A razor mechanism according to claim 17 wherein said neck member tapers gradually from said outer end to said inner end.

19. A razor mechanism according to claim 10 wherein said attaching means is biased away from said longitudinal axis.

20. A razor mechanism for use with a flexible cartridge comprising:

a housing having a distal end, a proximal end, a central longitudinal axis extending from said distal end to said proximal end, a substantially enclosed interior region;

at least one attachment member disposed at least partially within said housing, said attachment member having a proximal end pivotally connected to said housing in said interior region;

said attachment member further comprising an attachment end which is freely moveable in a direction substantially toward said longitudinal axis of said razor mechanism in response to the flexing of said flexible cartridge during shaving;

an actuator slidably connected to said housing along said longitudinal axis and in moveable engagement with said attachment member; and said actuator is biased toward the proximal end of said housing and wherein the movement of said actuator toward the distal end of said housing moves said attachment end in a direction substantially toward said longitudinal axis.

* * * * *